(12) United States Patent
Vinton et al.

(10) Patent No.: US 12,271,328 B2
(45) Date of Patent: Apr. 8, 2025

(54) PROCESSING COMPOSITE SIGNALS

(71) Applicants: Roger Alan Vinton, Kent (GB); Roger Nicholas McArdell, Kent (GB)

(72) Inventors: Roger Alan Vinton, Kent (GB); Roger Nicholas McArdell, Kent (GB)

( * ) Notice: Subject to any disclaimer, the term of this patent is extended or adjusted under 35 U.S.C. 154(b) by 0 days.

(21) Appl. No.: 17/740,622

(22) Filed: May 10, 2022

(65) Prior Publication Data
US 2022/0358068 A1 Nov. 10, 2022

(30) Foreign Application Priority Data
May 10, 2021 (GB) .................................... 2106658

(51) Int. Cl.
*G06F 13/38* (2006.01)
*G06F 1/26* (2006.01)

(52) U.S. Cl.
CPC ............ *G06F 13/385* (2013.01); *G06F 1/266* (2013.01)

(58) Field of Classification Search
CPC ............................... G06F 13/385; G06F 1/266
See application file for complete search history.

(56) References Cited

U.S. PATENT DOCUMENTS

| | | | |
|---|---|---|---|
| 2016/0370835 A1 | 12/2016 | Erickson | |
| 2016/0378704 A1* | 12/2016 | Adamson | G06F 13/364 710/104 |
| 2018/0011523 A1* | 1/2018 | Behrend | G06F 1/266 |
| 2019/0341711 A1* | 11/2019 | Justin | H04L 69/08 |
| 2021/0173441 A1* | 6/2021 | Tang | H05K 7/1417 |
| 2022/0011829 A1* | 1/2022 | Liang | G06F 1/1658 |
| 2022/0102926 A1* | 3/2022 | Justin | H01R 13/6205 |

FOREIGN PATENT DOCUMENTS

WO    WO 2019/179398 A1    9/2019

OTHER PUBLICATIONS

VESA, 2014, N/A, "VESA DisplayPort Alt Mode for USB Type-C Standard", pp. 1-17, http://www.displayport.org/wp-content/uploads/2014/09/DP-Alt-Mode-Overview-for-VESA-v1.pdf (the whole document).

\* cited by examiner

*Primary Examiner* — Henry Tsai
*Assistant Examiner* — Aurangzeb Hassan
(74) *Attorney, Agent, or Firm* — Shumaker & Sieffert, P.A.

(57) ABSTRACT

In some examples, an apparatus for processing a composite signal transmitted uses a first communication protocol via a first port comprising a first connector type, in which the apparatus comprises a processor configured to execute one or more instructions stored in a memory of the apparatus, whereby to cause the apparatus to isolate multiple components of the composite signal received at a first port of the apparatus, the first port of the apparatus, whereby to generate a first and second set of signal components, process at least one component from the second set of signal components to generate a converted signal component, transmit the first set of signal components and the converted signal component from a second port of the apparatus using a second communication protocol, and receive a power supply signal over the second port of the apparatus.

21 Claims, 2 Drawing Sheets

PROCESSING COMPOSITE SIGNALS

TECHNICAL FIELD

The present disclosure relates, in general, to videoconferencing.

BACKGROUND

Video conferencing is an established method of collaboration between remotely located participants. Such systems enable audio and/or video conferencing of multiple parties over packet-switched networks, such as the Internet. Using these systems, participants may simultaneously transmit and receive audio and/or video data streams. Typically, a conference server receives audio and/or video streams from the various participating sources (cameras, general computer devices such as pc's and laptops, as well as other sources), mixes the streams and retransmits the mixed streams to conference participants appearing from a remote location. At the same time, the conference server receives audio and/or video streams from remote sources and projects them on one or more screens for viewing by locally appearing participants. These video conferencing systems implement software along with a variety of cameras, viewing screens and other audio/video capturing devices.

Typically, instead of dedicated videoconferencing apparatus, users will connect a laptop or similarly portable device to a videoconferencing system to enable participation in a videoconference. For example, most modern laptop computers ship with USB Type-C (USB-C) connectors. This is a versatile connection system as the single, small connector can be used for: USB-3, USB-2, Network Connectivity, high-resolution video and audio and laptop charging power. Accordingly, a user may connect with a videoconference system via a USB-C cable, enabling them to lead or participate.

With the rise of video conferencing services such as Microsoft Teams and Zoom for example, there is generally a necessity to use USB-C connectivity in meeting rooms in order to enable user devices to connect with audio-visual equipment. Products exist that offer combined microphone/loudspeaker and camera systems that have USB-C inputs to connect to laptops. These systems are generally placed at one end of a room above a display to enable all participants in the room to be seen and heard, whilst ensuring that a display is also visible to all participants in the room. However, in order to achieve the full functionality that USB-C can offer, the specification requires that the USB-C cable connecting a laptop to another device, such as a videoconferencing system, may only be between 20 cm and 2 m in length—longer than this, and signal degradation becomes problematic. In a meeting room when a user wants to connect a laptop to the meeting room audio visual equipment at one end of the room, a maximum of 2 meters is typically insufficient. Accordingly, users are often stymied in their attempts to obtain full functionality or must sit at an uncomfortable distance and/or angle from the audio-visual equipment when using a cable that is 2 m or less in length.

Alternative systems come in the form of so-called breakout boxes or docks to which a laptop can be connected. These are typically located close to the laptop and multiple cables are then run from the breakout box or dock to the video conferencing device. These systems add complexity due to the need for a number of cables to be run from the box or dock to the videoconference system. The provision of multiple cables trailing over or under a desk in a meeting room for example, is also unsightly and possibly hazardous.

SUMMARY

An objective of the present disclosure is to provide a method, system and apparatus for enabling a connection from a device to be extended over a distance that would otherwise cause signal degradation or issues in a cost-effective and efficient manner.

The foregoing and other objectives are achieved by the features of the independent claims. Further implementation forms are apparent from the dependent claims, the description and the Figures.

A first aspect of the present disclosure provides an apparatus for processing a composite signal transmitted using a first communication protocol via a first port comprising a first connector type for a host device, the apparatus comprising a processor configured to execute one or more instructions stored in a memory of the apparatus, whereby to cause the apparatus to isolate multiple components of the composite signal received at a first port of the apparatus, the first port of the apparatus comprising a first connector type, whereby to generate a first set of signal components and a second set of signal components, process at least one component from the second set of signal components to generate a converted signal component, transmit the first set of signal components and the converted signal component from a second port of the apparatus using a second communication protocol, the second port of the apparatus comprising a second connector type, and receive a power supply signal over the second port of the apparatus.

The apparatus can convert one or more components of the composite signal from one format to another format, or from a signal or signal component configured for use with one communication protocol to a signal or signal component configured for use with another communication protocol. For example, the apparatus can convert a video signal component of the composite signal from one format to another. The multiple components of the composite signal that have been isolated can be transmitted from apparatus along with the converted component. For example, all of the multiple components of the composite signal except for the (or each) component that has been converted can be transmitted from apparatus along with the converted component or components. Transmission of the components can be made using a cable which is also used to supply the power supply signal, thereby enabling a signal from a device to be used for videoconferencing purposes whilst also enabling that device to be powered without the need for it to be attached to any other power sources.

In an example, the second set of signal components comprises a video signal. The first connector type can be a USB Type-C interface. In an implementation of the first aspect, the apparatus is configured to supply the power supply signal from the second port of the apparatus to the first port of the apparatus. The apparatus can receive the power supply signal over a cable connected to the second port of the apparatus. The second connector type can be an 8 position 8 contact interface or connector.

In an example, the at least one component from the second set of signal components can be a DisplayPort Alternative Mode signal component. The converted signal component can be an ultra-high-definition HDMI signal component. The second communication protocol can be an HDBaseT communication protocol.

A second aspect of the present disclosure provides a method for processing a composite signal transmitted using a first communication protocol via a first port comprising a first connector type for a host device, the method comprising isolating, or breaking out, multiple components of the composite signal received at a first port of an apparatus, the first port of the apparatus comprising a first connector type, processing at least one component of signal components to generate a converted signal component, transmitting the converted signal component and at least some of the multiple components of the composite signal from a second port of the apparatus using a second communication protocol, the second port of the apparatus comprising a second connector type, and receiving a power supply signal over the second port of the apparatus.

In an implementation of the second aspect, the method can further comprise converting one of the multiple components of the composite signal from one video format to another video format. The power supply signal can be supplied from the second port of the apparatus to the first port of the apparatus. The power supply signal can be supplied using the same cable that is used to transmit and/or receive the multiple components of the composite signal. The at least one component of the multiple components can be a DisplayPort Alternative Mode signal component. The converted signal component can be an ultra-high-definition HDMI signal component. The second communication protocol can be an HDBaseT communication protocol.

The power supply signal can be received at the second port of the apparatus as part of the signal used to transmit the first set of signal components and the converted signal component.

A third aspect of the present disclosure provides a system, comprising a first apparatus, and a second apparatus, wherein the first apparatus comprises a processor configured to execute one or more instructions stored in a memory of the first apparatus, whereby to cause the first apparatus to isolate multiple components of the composite signal received at a first port of the first apparatus, the first port of the apparatus comprising a first connector type, whereby to generate a first set of signal components and a second set of signal components, process at least one component from the second set of signal components to generate a converted signal component, transmit the first set of signal components and the converted signal component from a second port of the first apparatus using a second communication protocol, the second port of the first apparatus comprising a second connector type, and receive a power supply signal over the second port of the first apparatus.

In an implementation of the third aspect, the second apparatus comprises a processor configured to execute one or more instructions stored in a memory of the second apparatus, whereby to cause the second apparatus to receive at least some of the multiple components and the converted signal component, and supply the received multiple components and the converted signal component to respective ports of the second apparatus. The second apparatus can supply a power supply signal to the first apparatus. The power supply signal can be supplied from the second apparatus to the first apparatus over a cable used to transmit the first set of signal components and the converted signal component. The power supply signal can be received at the second port of the first apparatus as part of the signal used to transmit the first set of signal components and the converted signal component. The first connector type can be a USB Type-C interface. The second connector type can be an 8 position 8 contact interface.

A fourth aspect of the present disclosure provides a non-transitory machine-readable storage medium encoded with instructions for processing a composite signal transmitted using a first communication protocol via a first port comprising a first connector type for a host device, the instructions executable by a processor of a machine whereby to cause the machine to isolate multiple components of the composite signal received at a first port of the apparatus, the first port of the apparatus comprising a first connector type, whereby to generate a first set of signal components and a second set of signal components, process at least one component from the second set of signal components to generate a converted signal component, and transmit the first set of signal components and the converted signal component from a second port of the apparatus using a second communication protocol, the second port of the apparatus comprising a second connector type.

These and other aspects of the invention will be apparent from the embodiment(s) and example(s) described below.

BRIEF DESCRIPTION OF THE DRAWINGS

In order that the present invention may be more readily understood, embodiments of the invention will now be described, by way of example, with reference to the accompanying drawings, in which.

DETAILED DESCRIPTION

Figure 1:
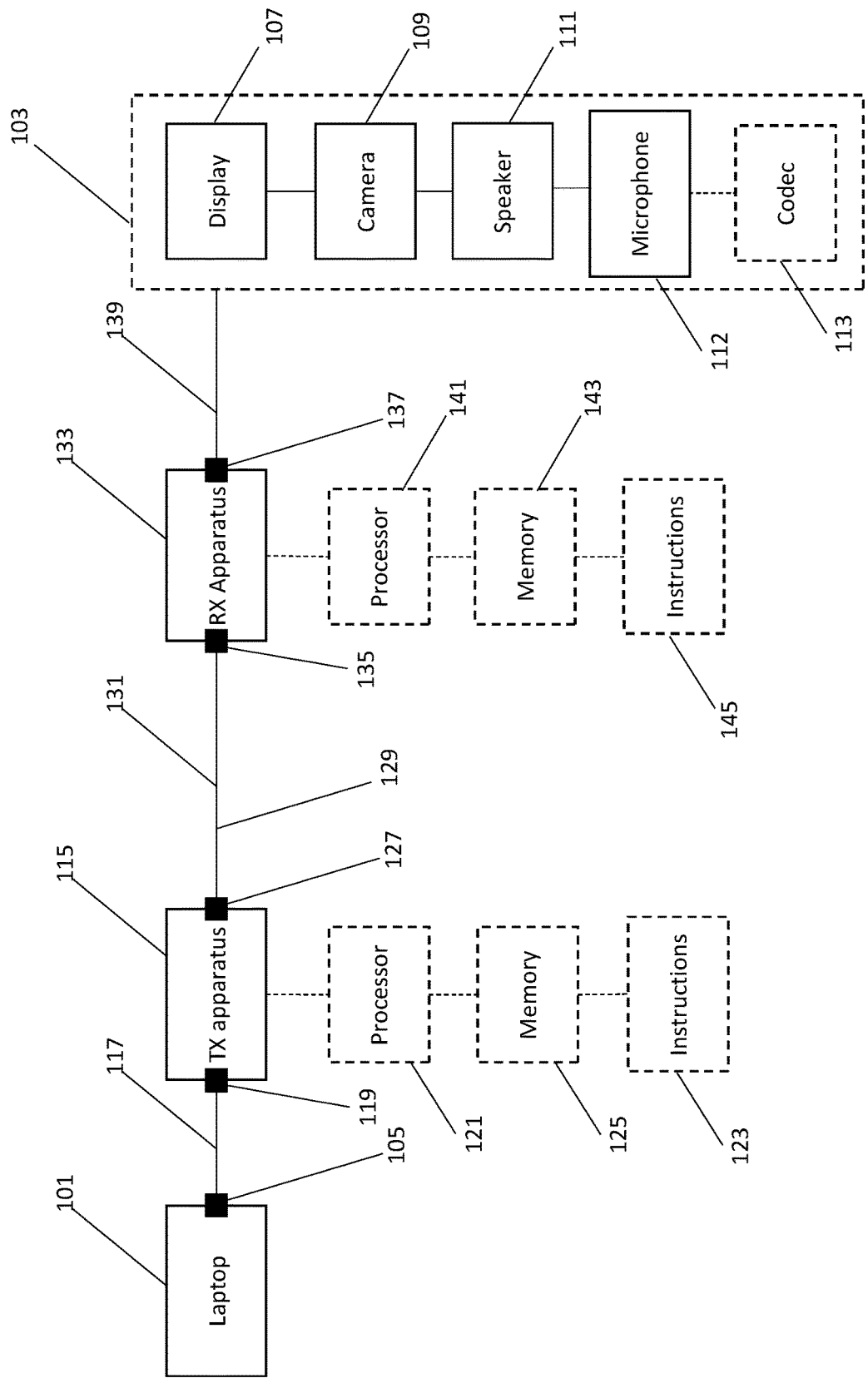
FIG. 1 is a schematic representation of a system according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

FIG. 1 is a schematic representation of a system according to an example. In the system of FIG. 1, a mobile device 101, such as a laptop computer for example is connected to audio-visual equipment 103 suitable for participating in, e.g., a videoconference. Device 101 can include a port 105 having a first connector type. For example, the port 105 can be a USB-C port.

Equipment 103 can comprise at least one of a display 107, camera 109, a microphone 112, and speaker system 111, and may form part of a videoconferencing system for example. In some examples, a codec 113 or similar device, capable of receiving an input signal and outputting it in a suitable format at the display and/or speaker system can be provided.

In the example of FIG. 1, the device 101 can be a network enabled device that is connected to, e.g., the internet. The device 101 can connect to a cloud-based videoconferencing platform and/or utilise a local videoconference client application in order to connect to and implement a videoconference using one of the systems mentioned above, or similar, for example. That is, in an example, equipment 103 may comprise hardware to display video and output audio, as well as a camera and/or microphone to enable capture of video and/or audio, all of which can be driven by the device 101 implementing an application for a videoconference platform. That is, equipment 103 can act as slave equipment to device 101 such that device 101 provides the functionality to enable a videoconference to be executed using the equipment 103. Accordingly, in an example, equipment 103 need have no special processing capability since it can be supplied with the data, video and audio feeds necessary to enable it to be used for videoconferencing. Nevertheless, in an example, equipment 103 may form part of a videoconferencing system proper, although the rest of the system is agnostic to the processing capabilities of the end audio-visual equipment used for display and so on.

As noted above, connection of the device 101 to equipment 103 is limited to a length that is defined by the specification implementing a communications protocol that uses, e.g., USB-C. According to an example, device 101 is connected to an apparatus 115. Apparatus 115 is configured to process a composite signal transmitted using a first communication protocol via a first port comprising a first connector type for a host device. In the example of FIG. 1, the host device is device 101. Accordingly, a composite signal 117 is transmitted by device 101 from a first port 105 comprising a first connector type, such as USB-C for example. In an example, the composite signal 117 is transmitted using a first communication protocol, such as DisplayPort Alternate Mode, thereby enabling device 101 to transmit data (e.g., up to an including USB 3.1) and audio/video (e.g., up to an including 8 k at 60 Hz). The composite signal 117 is thus a multi-component signal in which the components may be transmitted according to the prevailing communication protocol.

The composite signal 117 is received at a first port 119 of the apparatus 115, the first port 119 of the apparatus comprises a first connector type (e.g., USB-C). That is, device 101 can be connected to apparatus 115 using a USB-C to USB-C connection/cable. The apparatus 115 comprises a processor 121 configured to execute one or more instructions 123 stored in a memory 125 of the apparatus. According to an example, the instructions 123 are configured to cause the apparatus to isolate multiple components of the composite signal 117 received at the first port 119 of the apparatus 115, whereby to generate a first set of signal components and a second set of signal components. In an example, at least one of the set of signal components may be a null set, or may comprise at least a video and/or audio component of the composite signal 117. That is, apparatus 115 can break the composite signal 117 down into multiple signal components, at least one of which comprises a video signal component.

The instructions 123 further cause the apparatus to process at least one component from the second set of signal components to generate a converted signal component. In an example, the at least one component from the second set can be a video and/or audio component of the composite signal 117. The apparatus can transmit the first set of signal components and the converted signal component from a second port 127 of the apparatus using a second communication protocol. Accordingly, apparatus 115 can convert one or more components of the composite signal 117 from one format to another. For example, apparatus 115 can convert a video signal component of the composite signal 117 from one format to another, such as from a DisplayPort Alternative Mode signal component to an ultra-high-definition HDMI signal component for example. The multiple components of the composite signal that have been isolated can be transmitted from apparatus 115 along with the converted component. For example, all of the multiple components of the composite signal except for the (or each) component that has been converted can be transmitted from apparatus 115 along with the converted component or components. Alternatively, all or a proportion of the multiple components of the composite signal except for or including the component that has been converted can be transmitted from apparatus 115 along with the converted component.

In an example, the second port 127 of the apparatus comprises a second connector type. The second connector type can be different to the first connector type. For example, the second connector type can be an 8 position 8 contact interface used for, e.g., RJ45 connectors to support an HDBaseT communication protocol over a high bandwidth shielded twisted pair cable 131, such as a suitable Ethernet cable of the type used for Ethernet communications for example. Cable 131 can be used to transmit data using an HDBaseT communication protocol to other apparatus of the system as will be described in more detail below.

According to an example, cable 131 can be used to provide a power supply signal 129. Power supply signal can be used to power apparatus 115 and/or device 101. According to an example, the apparatus 115 receivers the power supply signal 129 over the second port 127. The power supply signal 129 may supply power up to, for example, 100 W. Accordingly, apparatus 115 can feed the power supply signal 129, or a modified version thereof (e.g., at a modified power or voltage level for example) for supply from port 119. That is, the power supply signal 129 can be provided to device 101 over the same cable used to supply the composite signal 117 to apparatus 115, such as a USB-C cable for example. Accordingly, device 101 can be powered via apparatus 115 without the need for it to be connected to any other power source. In an example, the power supply signal 129, or a component thereof, can also be used to provide power to the apparatus 115.

Thus, in an example, cable 131 can be used to connect apparatus 115 to upstream devices (such as apparatus 133 and/or equipment 103) and can provide uncompressed video and audio data signal components, a 100 BaseT Ethernet signal component, control signal components and power supply signal 129, all of which share the same cable 131. Cable 131 can be extended over distances up to 100 m using standard RJ-45 connectors. Pursuant to the HDBaseT protocol, cable 131 can therefore provide up to 100 W of power, over distances up to 100 m, requiring no additional power source. The provision of a single, potentially very long, cable 131 that can connect device 101 to equipment 103 and which enables device 101 to be powered without an external power source needing to be connected to it enables a clutter free, simple, cheap, effective and convenient means for driving equipment 103 using a device 101 for the purposes of, e.g., videoconferencing.

According to an example, the first connector type can be a USB Type-C interface. A second connector type can be an 8 position 8 contact interface. The at least one component from the second set of signal components can be a DisplayPort Alternative Mode signal component, and the converted signal component can be an ultra-high-definition HDMI signal component. That is, a video and/or audio component of the composite signal 117 can be isolated and converted to a UHD HDMI signal component. The second communication protocol can comprise an HDBaseT communication protocol. Accordingly, the converted signal can be transmitted from the second port 127 of apparatus 115 over an HDBaseT communication protocol.

In an example, a connection from second port 127 of apparatus 115 can utilise a high bandwidth shielded twisted pair cable, which is widely available, cheap and can be used over long distances. The second communication protocol, e.g., HDBaseT can thus be used to transmit data from apparatus 115 over longer distances than would otherwise be the case when using the first communication protocol, e.g., DisplayPort Alternate Mode over USB-C. It is therefore possible for device 101 to be used with equipment 103 from farther away than would otherwise be the case if device 101 were connected to equipment 103 over USB-C to USB-C connections. As noted above, power supply signal 129 can be transmitted using cabling 131. For example, power over HDBaseT (PoH) enables the transmission of DC power in conjunction with data signals over a single high bandwidth shielded twisted pair cable to distances of around 100 meters. In an example, the power supply signal 129 can be provided by an apparatus 133, which will be described in more detail below, or the equipment 103, or by the apparatus 115 for example, any one or more of which may be connected to a power source that can be used to provide power for the device in question and/or provide the power supply signal 129.

In an implementation, codec 113 may be provided in apparatus 133. Accordingly, signals received over cable 131 can be received at a port 135 of apparatus 133, which may comprise a second connector type for example. The signals can be processed by the codec of the apparatus 133 and sent as suitable videoconferencing signals 139 to equipment 103 via another port (or ports) 137 of apparatus 133. Port 137 can comprise any suitable connector type capable of connecting to the equipment 103 and may be, e.g., USB-C, HDMI or USB 2.0. Apparatus 133 comprises a processor 141 configured to execute one or more instructions 145 stored in a memory 143 of the apparatus 133. According to an example, the instructions 145 are configured to cause the apparatus 133 to provide or render the components of the composite signal transmitted by apparatus 115 for use by equipment 103. For example, apparatus 133 may simply comprise a number of connection ports that enable individual component of the equipment 103 to be connected thereto in order to enable each component to receive a corresponding signal component. For example, display 107 can be connected to a display port of apparatus 133 to enable it to receive a video component and so on.

Therefore, according to an example, USB-C signals can be effectively extended over long distances using cheap and ubiquitous network style cables. Apparatus 115 enables connection of a USB-C device 101 to equipment 103 by way of an intermediate, e.g., HDBaseT signal. That is, device 101 can connect to apparatus 115 using a USB-C cable, and apparatus 115 can be connected to equipment 103 using a high bandwidth shielded twisted pair cable.

Apparatus 115 is used to breakout the components of a composite signal transmitted over the USB-C connection into its constituent parts. In an example, the constituent parts of the composite signal (i.e., the multiple components of the composite signal) can be a DisplayPort Alternate Mode video component, and a USB-2 data component. In an example, the DisplayPort Alternate Mode video component is converted to a 4K, Ultra-High-definition HDMI video component and a 100 Mbps network signal component while still preserving an additional USB-2 signal for the connection of devices further downstream from apparatus 115.

The HDBaseT communication protocol can be used to transmit HDMI video with low or no compression and with low latency while simultaneously transmitting a 100 Mbps network signal component. HDBaseT also contains data channels which can be used to transmit USB-2 and a serial data channel which can be used to coordinate operation between the apparatus 115 and apparatus 133 (e.g., transmission electronics and receiver electronics).

Having converted the composite signal into its constituent parts, it is therefore possible to transmit these signals over HDBaseT and send them over a much greater distance than would be possible with native USB-C. At the receiving end, such as at apparatus 133 for example, the HDBaseT carrier transmitted using cable 131 can be converted back to its components of HDMI video, 100 Mbps network and USB-2. It is possible to convert these signals back into composite signal for transmission over a USB-C connection, but this may not be necessary at the receiving end as these can simply be made available individually to different devices and connections of the equipment 103 as outlined with reference to FIG. 1 for example.

According to an example, and as described above, device 101 can participate in a videoconference by way of a cloud-based or local engine that is used to implement a videoconferencing platform in question. However, when device 101 is executing such an engine, it is important that it maintains enough power so that its onboard power supply (e.g., batteries) do not deplete to the point that the device 101 suspends activity (e.g., shuts down, hibernates etc.).

In an example, ports 105, 119 can be connected using a USB-C cable, which has power charging built into the protocol. Accordingly, the power supply signal 129 can be provided at up to 100 W directly to the device 101 meaning that, for example, power sockets are not required. Power can be sent from the far end of the system (103 or 133) with up to 100 W being available for charging the device 101 via the USB-C connector.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, user equipment such as a smart device, e.g., a smart phone, a special purpose computer, an embedded processor or processors of other programmable data processing devices or apparatus to realize the functions described in the description and diagrams. In particular, a processor or processing apparatus may execute the machine-readable instructions. Thus, modules of apparatus (for example, a module implementing a function to convert a component of a composite signal) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 2:
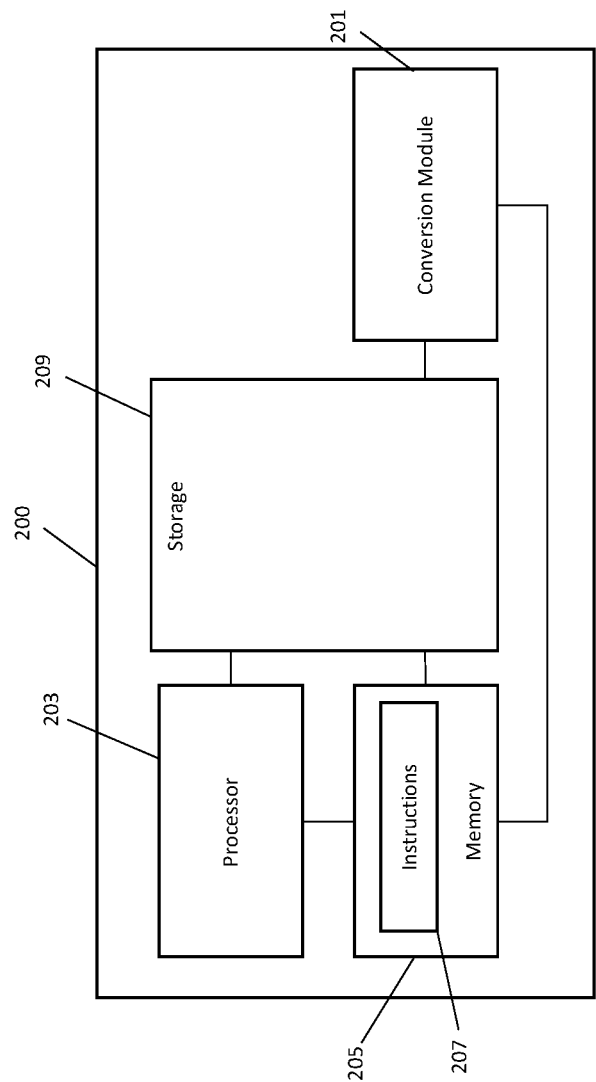
FIG. 2 is a schematic representation of a machine forming an apparatus according to example.

FIG. 2 is a schematic representation of a machine forming an apparatus according to example. The machine 200 comprises a processor 203, and a memory 205 to store instructions 207, executable by the processor 203. The machine comprises a storage 209 that can be used to store at least one of a composite signal, multiple components thereof, a converted signal component, the first set of signal components and/or the second set of signal components. The instructions 207, executable by the processor 303, can cause the machine to isolate multiple components of the composite signal received at a first port of the apparatus, the first port of the apparatus comprising a first connector type, whereby to generate a first set of signal components and a second set of signal components, process at least one component from the second set of signal components to generate a converted signal component using, e.g., a conversion module 201, transmit the first set of signal components and the converted signal component from a second port of the apparatus using a second communication protocol, the second port of the apparatus comprising a second connector type, and receive a power supply signal over the second port of the apparatus.

Accordingly, the machine 200 can implement a method for processing a composite signal transmitted using a first communication protocol via a first port comprising a first connector type for a host device. Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer or software product, such as a non-transitory machine-readable storage medium, the computer software or product being stored in a storage medium and comprising a plurality of instructions, e.g., machine readable instructions, for making a computer device implement the methods recited in the examples of the present disclosure.

In some examples, some methods can be performed in a cloud-computing or network-based environment. Cloud-computing environments may provide various services and applications via the Internet. These cloud-based services (e.g., software as a service, platform as a service, infrastructure as a service, etc.) may be accessible through a web browser or other remote interface of the user equipment 300 for example. Various functions described herein may be provided through a remote desktop environment or any other cloud-based computing environment.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. In addition, one or more of the modules described herein may transform data, physical devices, and/or representations of physical devices from one form to another.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the scope of the instant disclosure. The embodiments disclosed herein should be considered in all respects illustrative and not restrictive. Reference should be made to the appended claims and their equivalents in determining the scope of the instant disclosure.

The invention claimed is:

1. An apparatus for processing a composite signal transmitted using a first communication protocol via a first port comprising a first connector type for a host device, the apparatus comprising a processor configured to execute one or more instructions stored in a memory of the apparatus, whereby to cause the apparatus to:

isolate multiple components of the composite signal received at the first port of the apparatus, whereby to generate a first set of signal components and a second set of signal components;

process at least one component from the second set of signal components to generate a converted signal component;

transmit the first set of signal components and the converted signal component from a second port of the apparatus using a second communication protocol that is different from first communication protocol, the second port of the apparatus comprising a second connector type that is different from the first connector type; and receive, at the first port of the apparatus, a power supply signal from the second port of the apparatus, wherein the power supply signal is configured to supply power for a host device connected to the first port of the apparatus.

2. The apparatus as claimed in claim 1, wherein the second set of signal components comprises a video signal.

3. The apparatus as claimed in claim 1, wherein the first connector type is a USB Type-C interface.

4. The apparatus as claimed in claim 1, wherein the apparatus is configured to receive the power supply signal at the second port of the apparatus from a cable connected to the second port of the apparatus.

5. The apparatus as claimed in claim 1, wherein the second connector type is an 8 position 8 contact interface.

6. The apparatus as claimed in claim 1, wherein the at least one component from the second set of signal components is a DisplayPort Alternative Mode signal component.

7. The apparatus as claimed in claim 1, wherein the converted signal component is an ultra-high-definition HDMI signal component.

8. The apparatus as claimed in claim 1, wherein the second communication protocol comprises an HDBaseT communication protocol.

9. A method for processing a composite signal transmitted using a first communication protocol via a first port comprising a first connector type for a host device, the method comprising:

isolating multiple components of the composite signal received at the first port of an apparatus;

processing at least one component of signal components to generate a converted signal component;

transmitting the converted signal component and at least some of the multiple components of the composite signal from a second port of the apparatus using a second communication protocol that is different from first communication protocol, the second port of the apparatus comprising a second connector type that is different from the first connector type; and receiving, at the first port of the apparatus, a power supply signal from the second port of the apparatus, wherein the power supply signal is configured to supply power for a host device connected to the first port of the apparatus.

10. The method as claimed in claim 9, further comprising converting one of the multiple components of the composite signal from one video format to another video format.

11. The method as claimed in claim 9, further comprising supplying the power supply signal from the second port of the apparatus to the first port of the apparatus.

12. The method as claimed in claim 9, wherein the at least one component of the multiple components is a DisplayPort Alternative Mode signal component.

13. The method as claimed in claim 9, wherein the converted signal component is an ultra-high-definition HDMI signal component.

14. The method as claimed in claim 9, wherein the second communication protocol comprises an HDBaseT communication protocol.

15. The method as claimed in claim 9, wherein the power supply signal is received at the second port of the apparatus as part of the signal used to transmit the first set of signal components and the converted signal component.

16. A system, comprising:

a first apparatus, and a second apparatus, wherein the first apparatus comprises a processor configured to execute one or more instructions stored in a memory of the first apparatus, whereby to cause the first apparatus to:

isolate multiple components of a composite signal received at a first port of the first apparatus using a first communication protocol, the first port of the first apparatus comprising a first connector type, whereby to generate a first set of signal components and a second set of signal components;

process at least one component from the second set of signal components to generate a converted signal component;

transmit, to the second apparatus, the first set of signal components and the converted signal component from a second port of the first apparatus using a second communication protocol that is different from the first communication protocol, the second port of the first apparatus comprising a second connector type that is different from the first connector type; and receive, at a second port of the first apparatus, a power supply signal from the second apparatus, wherein the power supply signal is configured to supply power for a host device connected to the first port of the first apparatus.

17. The system as claimed in claim 16, wherein the second apparatus comprises a processor configured to execute one or more instructions stored in a memory of the second apparatus, whereby to cause the second apparatus to:

receive at least some of the multiple components and the converted signal component; and supply the received multiple components and the converted signal component to respective ports of the second apparatus.

18. The system as claimed in claim 16, wherein the power supply signal is supplied from the second apparatus to the second port of the first apparatus using a cable configured to transmit the first set of signal components and the converted signal component from the second port of the first apparatus.

19. The system as claimed in claim 16, wherein the power supply signal is received at the second port of the first apparatus as part of the signal used to transmit the first set of signal components and the converted signal component.

20. The system as claimed in claim 16, wherein the first connector type is a USB Type-C interface.

21. The system as claimed in claim 16, wherein the second connector type is an 8 position 8 contact interface.

* * * * *